United States Patent
Cheng et al.

(10) Patent No.: US 8,238,678 B2
(45) Date of Patent: Aug. 7, 2012

(54) PROVIDING REPRESENTATIVE IMAGE INFORMATION

(75) Inventors: Qiang Cheng, Carbondale, IL (US); Steven F. Owens, Denville, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 957 days.

(21) Appl. No.: 11/769,292

(22) Filed: Jun. 27, 2007

(65) Prior Publication Data

US 2008/0056586 A1 Mar. 6, 2008

Related U.S. Application Data

(60) Provisional application No. 60/841,261, filed on Aug. 30, 2006, provisional application No. 60/829,406, filed on Oct. 13, 2006.

(51) Int. Cl.
*G06K 9/46* (2006.01)
(52) U.S. Cl. ........................................ 382/240
(58) Field of Classification Search .................. None
See application file for complete search history.

(56) References Cited

U.S. PATENT DOCUMENTS

| | | | |
|---|---|---|---|
| 5,490,221 A * | 2/1996 | Ransford et al. .............. | 382/130 |
| 5,524,130 A | 6/1996 | Ohhashi | |
| 5,548,694 A * | 8/1996 | Frisken Gibson ............ | 345/424 |
| 5,764,803 A | 6/1998 | Jacquin et al. | |
| 6,621,918 B1 * | 9/2003 | Hu et al. ....................... | 382/128 |
| 7,039,723 B2 * | 5/2006 | Hu et al. ....................... | 709/248 |
| 7,194,122 B2 * | 3/2007 | Faber et al. .................... | 382/131 |
| 7,689,539 B2 * | 3/2010 | Sjoblom et al. ........ | 707/999.002 |
| 2002/0080143 A1 * | 6/2002 | Morgan et al. ................ | 345/581 |
| 2003/0055896 A1 * | 3/2003 | Hu et al. ....................... | 709/205 |
| 2003/0068075 A1 * | 4/2003 | Faber et al. .................... | 382/131 |
| 2003/0123551 A1 | 7/2003 | Kim | |
| 2004/0136501 A1 | 7/2004 | Boyd et al. | |
| 2005/0260658 A1 * | 11/2005 | Paladini et al. .................. | 435/6 |
| 2007/0269117 A1 * | 11/2007 | Ernvik et al. ................. | 382/232 |

FOREIGN PATENT DOCUMENTS

| | | |
|---|---|---|
| CN | 1329438 A | 1/2002 |
| CN | 1550109 A | 11/2004 |
| CN | 1645415 A | 7/2005 |
| DE | 101 49 556 A1 | 4/2003 |

OTHER PUBLICATIONS

English translation of Office Action dated May 26, 2009 in German Patent Application No. 10 2007 040 585.7-55.
English translation of Office Action dated Jun. 26, 2010 in Chinese Patent Application No. 200710170195.4.
Wang et al., "Multiple Description Coding for Video Delivery", IEEE, vol. 93, No. 1., Jan. 2005, pp. 57-70.
Foley et al., "Computer Graphics Principles and Practices".
Office Action dated Aug. 31, 2011 in Chinese Patent Application No. 200710170195.4 (English translation included).
Wang, et al., "Multiple Description Coding for Video Delivery", Proceedings of the IEEE, vol. 93, No. 1, Jan. 2005, pp. 57-70.

* cited by examiner

*Primary Examiner* — Samir Ahmed
(74) *Attorney, Agent, or Firm* — Peter Kendall

(57) ABSTRACT

Providing information representative of an image in an interactive visualization system includes selecting a current image from a stream of images, evaluating context information within the visualization system, and determining representative information for the current image on the basis of the context information.

23 Claims, 8 Drawing Sheets

PROVIDING REPRESENTATIVE IMAGE INFORMATION

CROSS-REFERENCE TO RELATED APPLICATION(S)

This application claims the benefit of priority under 35 U.S.C. §119(e) of U.S. Provisional Patent Application Ser. No. 60/829,406, filed on Oct. 13, 2006 and entitled "Hierarchical Inter-frame Compression Systems and Methods for Remote Interactive Visualization Services of 3D Medical Data" and of U.S. Provisional Patent Application Ser. No. 60/841,261, filed on Aug. 30, 2006 and entitled "Inter-Frame Compression Methods And Systems For Windowing And Leveling Operations In Client-Server Environment," the contents of which are hereby incorporated by reference.

TECHNICAL FIELD

This invention relates to the visualization of images, and more particularly to the compression of image information.

BACKGROUND

Appropriate visual presentation of measured data is essential in a variety of technological fields, for example, in medical and scientific research as well as in clinical practice. The visualization of volumetric data as a 2D image is achieved by visualization applications, for example, by a volumetric rendering application. The visualization application can be interactive, i.e., allow a user to control viewing parameters like the viewing angle and the magnification. Moreover, the visualization application can be remotely controlled. For example, the bulk of a rendering calculation can be executed on a specially equipped rendering computer, while the user controls the visualization from a different computer. Generally, the quality of the analysis and interpretation of the data depends on how efficient and with what quality such visualization applications can provide required image information to a user.

Medical applications handle, for example, volumetric data gained by computer tomography, radiography, cardiac or peripheral angiography, and nuclear magnetic resonance imaging. in such applications, medical personnel interact with the visualization applications to find the best view(s) of an object for the analysis. During such interactions, rendering algorithms calculate the different views. Typical rendering algorithms include ray casting and ray tracing algorithms.

In visualization applications, a rendered image is mainly a projection of a 3D volumetric object on a viewing (or imaging) plane. The projection can be either orthographic, paraperspective or perspective. A rendering algorithm can run, for example, on a single workstation or within a remote client-server system or a peer-to-peer system. Important requirements for a rendering system are high reliability of a fast, high quality visualization that allows as close as possible real time visualization of 3D data.

In a client-server environment, the sheer amount of 3D data, which can exceed 10 GB, makes it impractical to replicate and transmit data to each individual user. The complexity and performance requirements of rendering applications may also limit the installation of rendering tools on end-users' machines. In this case, a user may send a request to render a dataset stored on a remotely located rendering service that has been specifically designed to handle the complexity and performance requirements of volume visualization. In such client-server environments, the server renders a sequence of 2D images from volumetric data in response to client requests, and then sends those rendered images, through a communication network, to the requesting client. The client will present those images to the user as a stream of images that correspond to the visualization requests of the user.

The quality of service of the remote visualization requires low latency. Often, a near zero wait time at the client side is critical for an efficient clinical workflow. For real-time interactions between users and rendered images, both the rendering and the transmission though a communications network to the client should preferably be fast. Interactive applications prefer not only high-performance rendering by the server, but also prompt transmission through the network. When the communications network is unable to fulfill the bandwidth demand, for example, due to resource limitations and network traffic, compression techniques can be employed to mitigate the bandwidth demand.

In video compression, interframe redundancy, i.e., information common to each frame in a series of frames, is often important for effective compression. In particular, many compression techniques exploit redundancy between neighboring frames, especially when the sampling frequency is high.

Interactive visualization applications, however, have requirements and characteristics that differ from most other visualization applications. Because of these differences, a client may not have sufficient computational power to apply standard video compression methods. Therefore, interactive visualization applications require compression structures, methods, and systems that differ from the existing video compression techniques.

SUMMARY

The invention is based in part on the fact that in an interactive compression system context information can be exploited to determine what kind of representative information for a current image should be provided for transmission.

In one aspect, providing information representative of an image in an interactive visualization system includes selecting a current image from a stream of images, evaluating context information within the visualization system, and determining representative information for the current image on the basis of the context information.

In another aspect, a visualization system for providing information representative of an image includes a rendering system for rendering images from 3D data and a context-sensitive compressing system providing image information representative for a rendered image on the basis of context-sensitive information.

Implementations may include one or more of the following features. Data is retrieved from a 3D-data set, which is representative of the current image and the current image is rendering on the basis of the retrieved data. The representative image information is coded for transmission and the coded representative image information is transmitted to a visualization unit of the visualization system. The coded representative image information is reconstructed to a reconstructed image, which is displayed.

The context information is selected from the group consisting of a user induced visualization parameter, a visualization-implicit parameter, a user induced system parameter, and a system-implicit parameter.

The representative image information is determined to be one of the group consisting of the current image, intra-frame reduced image information of the current image, and context-sensitive compressed image information of the current image.

The representative image information is determined to have a fidelity, which specifies a reconstruction of a lossy reconstructed image. The representative image information includes intra-frame reduced image information, which is generated using a down sampling method, a subband image processing method or a pyramid method.

Providing representative information may further include providing an input image, identifying prediction information given by the context information and determining a predicted image using the prediction information and the input image. An error-image is determined on the basis of the predicted image and the current image and it is statistically evaluated to determine whether the prediction information and the error image constitute the context-sensitive compressed image information.

The input image may be selected from the group consisting of the current image, a previously predicted image, and a previously reconstructed image. The predicted image may be determined using a prediction stage selected of the group consisting of a linear prediction stage, a prediction stage using a predicted parameter and a known operation, and a prediction stage using a predicted operation and a predicted parameter of the predicted operation.

The prediction information may be applied to a section of the input image and context-sensitive compressed image information of the section may be a part of the representative image information.

The predicted image may be reproduced using the prediction information and the input image and the predicted image may be combined with the error image to reconstruct a reconstructed image, which is displayed.

On the basis of the available context information, the coding of the representative information of the current image and/or the reconstruction may be adapted. The coding of the representative information of the current image may use a multiple description scheme.

The visualization system may include a controlling unit within the context-sensitive compressing system for controlling the provided representative image information to be from the group consisting of the current image, intra-frame reduced image information of the current image, and context-sensitive compressed image information of the current image.

The visualization system may include a decompressing system and a visualization unit, the decompressing system is connected to the compressing system through a network to receive the representative image information for reconstructing a reconstructed image, and the decompressing system being connected to the visualization unit to provide the reconstructed image to the visualization unit for displays the reconstructed image.

The visualization system may include a coding unit to code the representative image information for transmitting the coded representative image information to the decompressing system.

These general and specific aspects may be implemented using a system, a method, a computer readable medium, or a computer program, or any combination of systems, methods, a computer readable medium, or a computer programs.

Certain implementations may have one or more of the following advantages. Context information can be utilized to achieve high compression ratios. Flexible structures enable the system to handle dramatic changes, progressive and interruptible quality requirements, and resource limitations. Lossless and lossy representative image information can be provided in interactive and definitive modes, respectively.

The quality can be controllable by the users according to the user's preference for visual quality. Therefore, the representative image information is adaptable to a range of scenarios requiring different levels of quality of reconstructed images.

The compression exploits a flexible structure that dynamically adapts to rendered sequences and context information; specifically, context and inter-frame information can be utilized on-the-fly without fixing inter-frame intervals. The frame rates are variable depending upon the density of the rendered sequences or the users' requests.

The computation of a client can be adapted to the resources of the client. The adaptation can either be manually chosen by the users or automatically set by a feedback mechanism within the visualization system. Thus, the computation at the client side is minimal and the memory requirement for the clients may be small.

The compression system can exploit the context information in a multi-stage and multi-resolution fashion. The multi-stage design may make the compression suitable for heterogeneous client machines and bandwidth conditions.

The provided representative image information can either dynamically adapt itself based on the computational capabilities of the clients or changing network conditions, or be manually set by the user. For example, if the network bandwidth is high and there is a thin client requesting rendered images, the system adapts by making the reconstruction step simple. Conversely, if there is a rich client connected to a low bandwidth network, the compression adapts by minimizing the data transmitted and permitting the client to perform more of the reconstruction process during decompressing.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
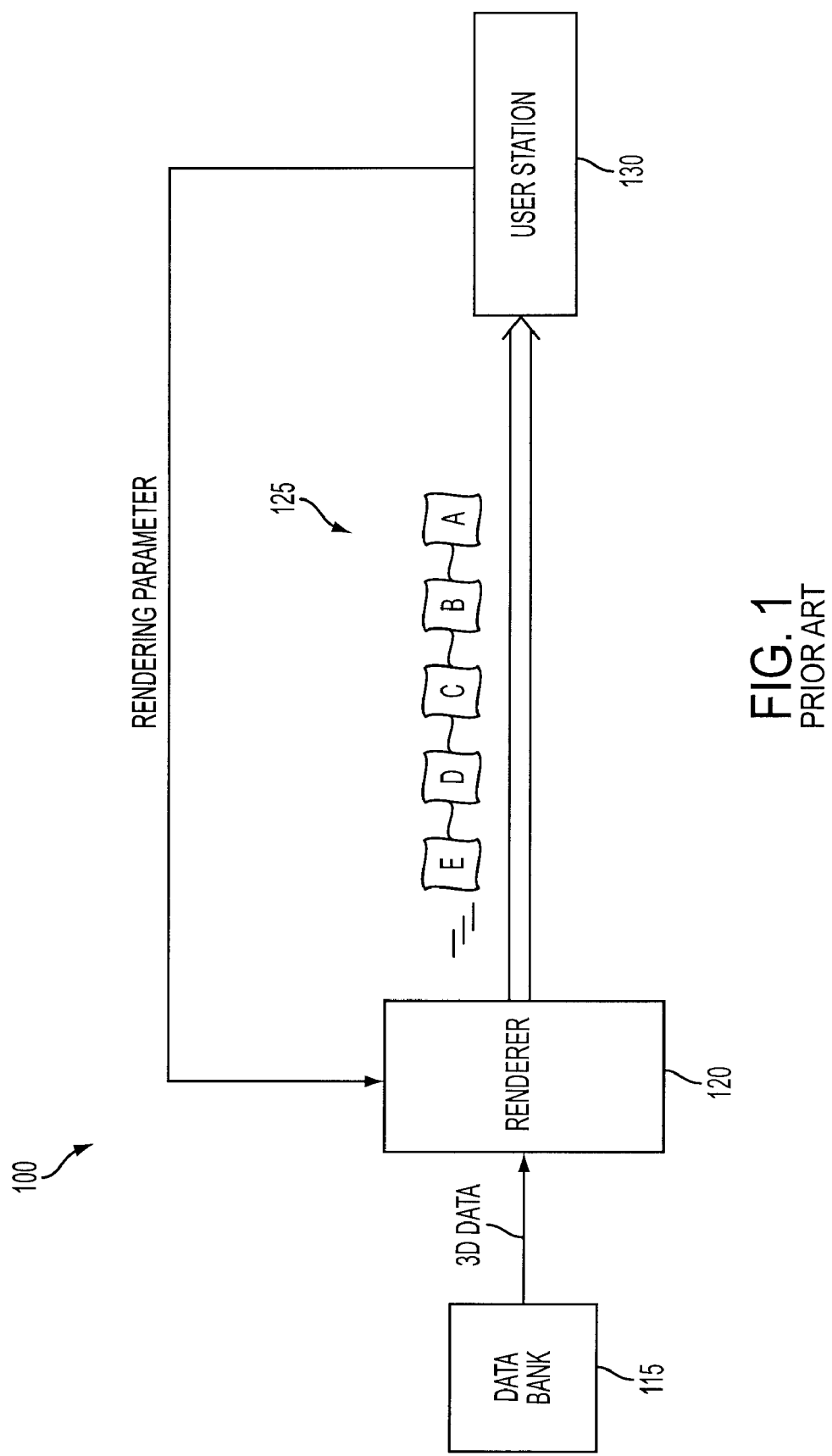
FIG. 1 is a schematic illustration of a rendering system.

FIG. 1 illustrates a rendering application system 100. For volumetric data provided by a databank 115, a renderer 120 calculates a series of 2D projection images A, B, C, D, E . . . The images are provided to a user station 130 as a data stream 125 and presented, for example, on a screen of the user station 130. The renderer 120 and the user station can be, for example, connected through a network. Using the user station 130, a user controls the renderer 120 by specifying rendering parameters. Examples for rendering parameters include the viewing angle, magnification, and the type of presentation (e.g., Maximum Intensity Projection, Multi-Planar Reconstruction, Surface Shaded Display, or Volume Rendering Technique). Using the rendering parameters, the renderer 120 calculates the current image required by the user. The user uses an interface of the user station 130 to assign the rendering parameters. For example, he might use a joystick to slowly rotate his viewing direction, in response to which the renderer 120 calculates a series of images having slightly different angles of projection. Alternatively, the user can zoom into the 3D data from a fixed viewing direction, in response to which the renderer 120 produces a series of images with increasing magnification.

General Concept of Context-Sensitive Compression

Figure 2:
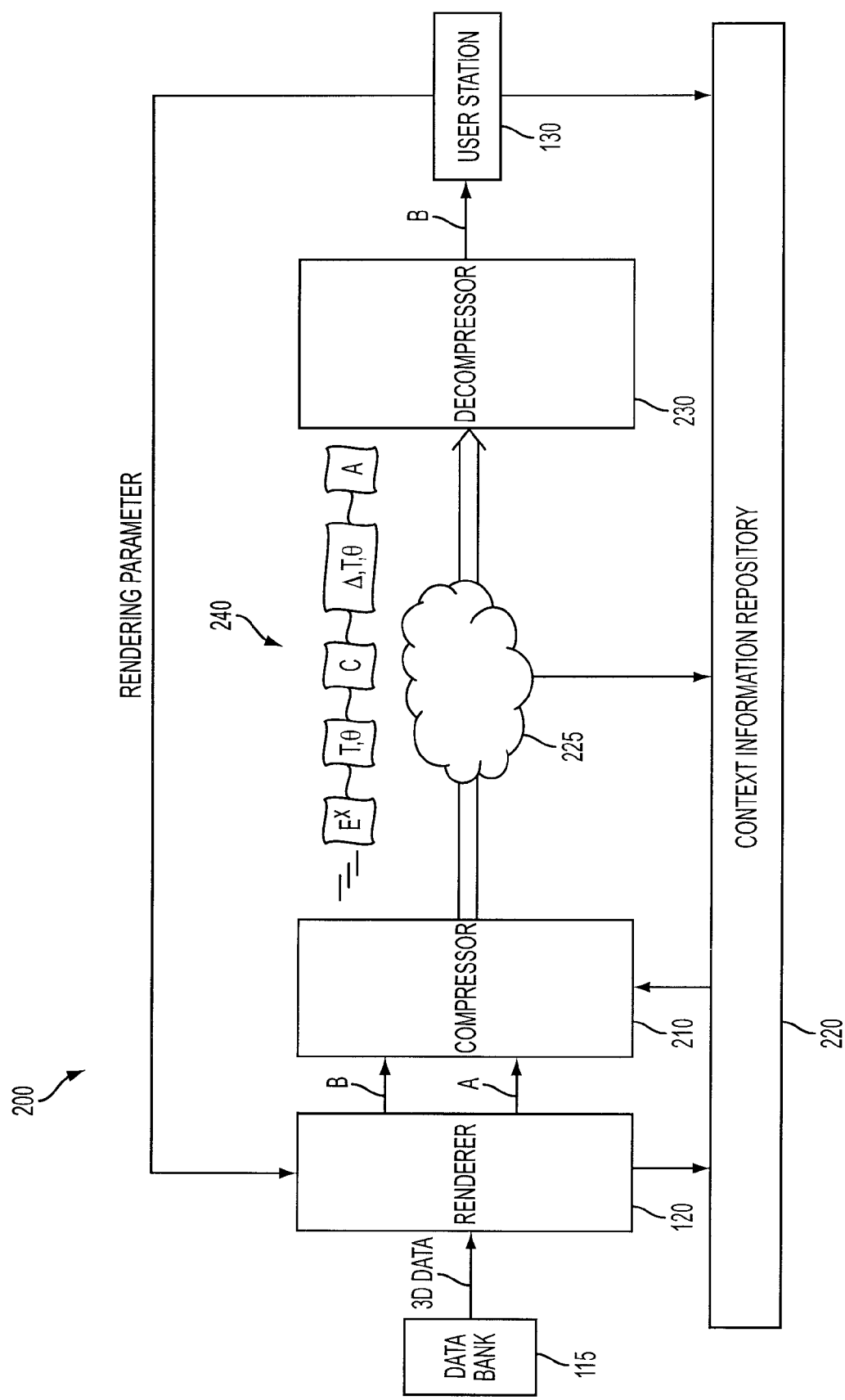
FIG. 2 is an overview schematic of a context-sensitive compression system.

FIG. 2 is an overview of an exemplary context-sensitive visualization system 200. As in FIG. 1, the renderer 120 renders a series of 2D projection images A, B in response to rendering parameters provided by the user station 130. A compressor 210 uses context information available from a context information repository 220 to predict a predicted image, to evaluate this prediction, and to provide data for a compressed transmission of image information to the user station 130. Examples of context information include the rendering parameters specifying the rendered images, as well as renderer-implicit parameters (e.g., type of ray projection) used by the renderer 120 or system context information, e.g., information about a load of a network 225 and information about specific user requirements, such as whether the compression is to be lossless or lossy. If necessary, a decompressor 230 decompresses the image information before it is provided to the user station 130.

By using and evaluating the context information, the system 200 determines whether the transmitted image information should be an uncompressed rendered image (indicated as capital letters in the data stream 240) or compressed image information. For example, information about a known motion (T, θ) or a predicted motion (T', θ') of the view point can be transmitted with or without an error image (Δ), to allow recovery of an image without having to transmit the entire rendered image. If the user is willing to tolerate a lossy compression, the transmitted image information can include a rendered image or error image with a reduced fidelity. This is indicated as image E* in the compressed data stream 240.

Figure 3:
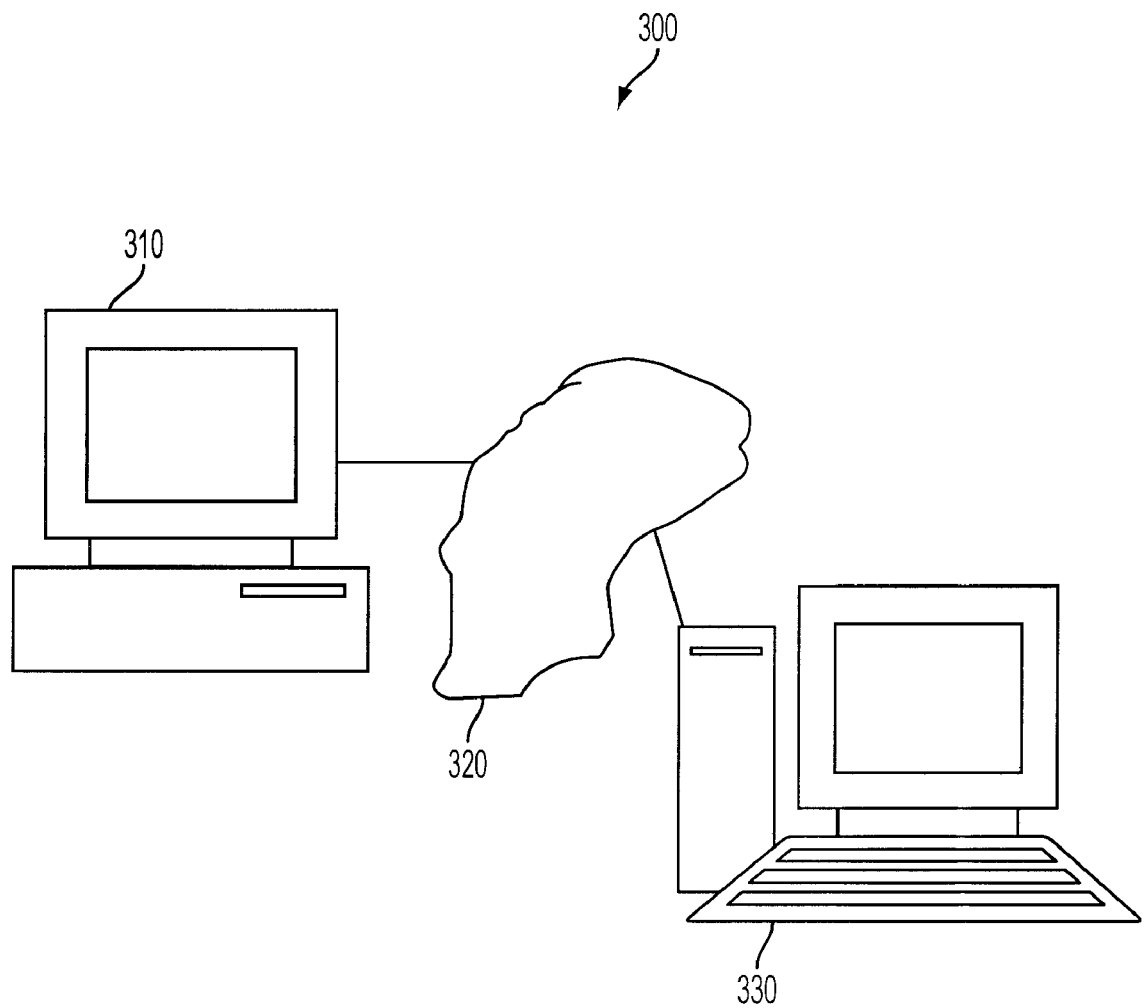
FIG. 3 is a diagram illustrating an exemplary system for performing hierarchical inter-frame compression for remote interactive viewing.

FIG. 3 is a diagram illustrating an exemplary system for performing compression for remote interactive viewing in accordance with an embodiment of the present invention. The system 300 comprises a server 310, a network 320 and a user-terminal 330. The network 320 may comprise a local area network, a wide area network, or combinations thereof. The server 310 and user-terminal 330 comprise computers. In accordance with an embodiment of the present invention, the system 300 adaptively shifts computations between the server 310 and the user-terminal 330 in response to user preferences, network conditions, computational capabilities of the user terminal 330, and/or feedback from the user terminal 330. In addition, user interaction, such as predefined movements relating to an interactive mode, can be used to determine how images are to be compressed or rendered.

Lossless Compression

Figure 4:
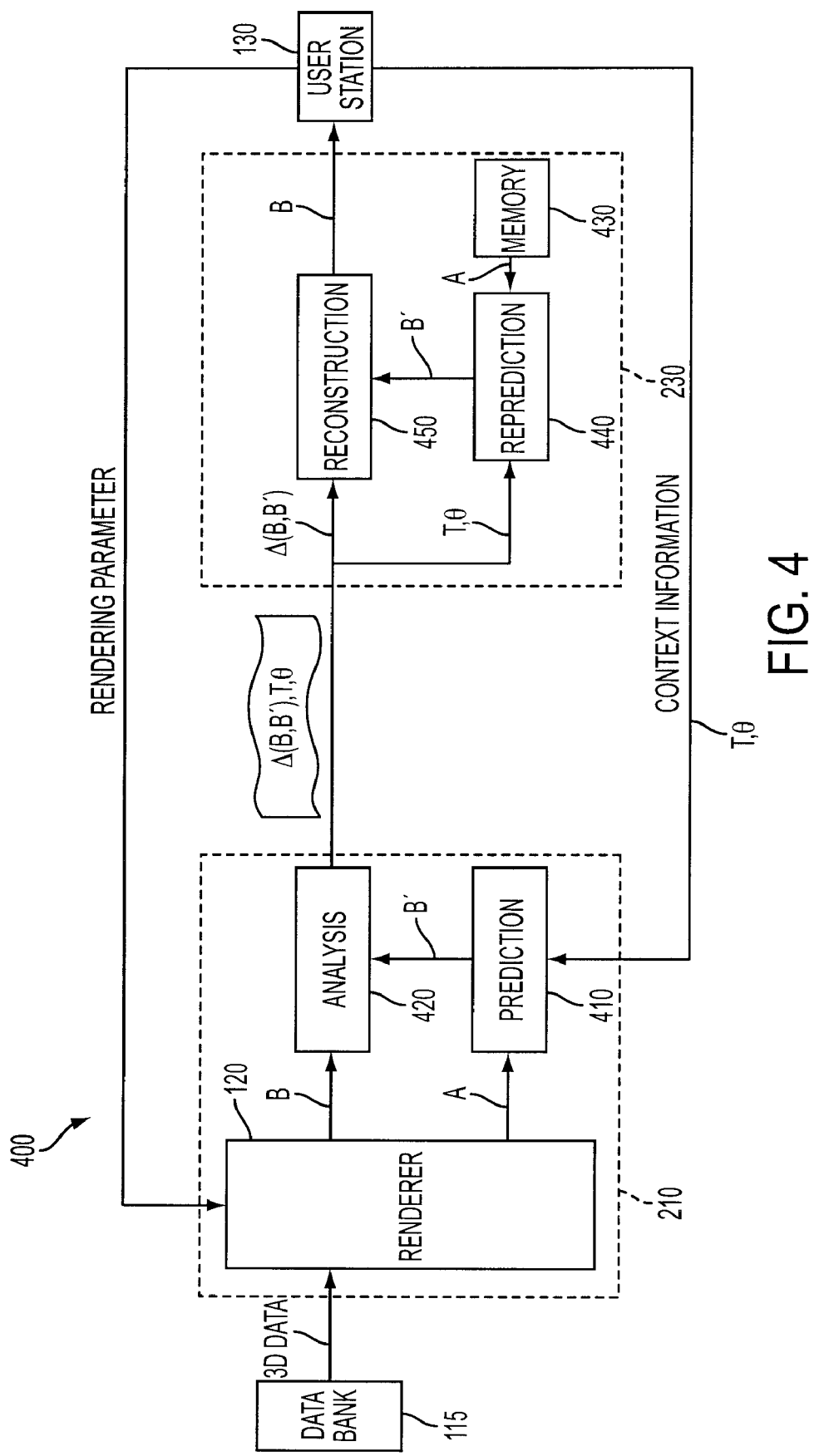
FIG. 4 is an overview flowchart of a lossless context-sensitive compression.
Figure 5:
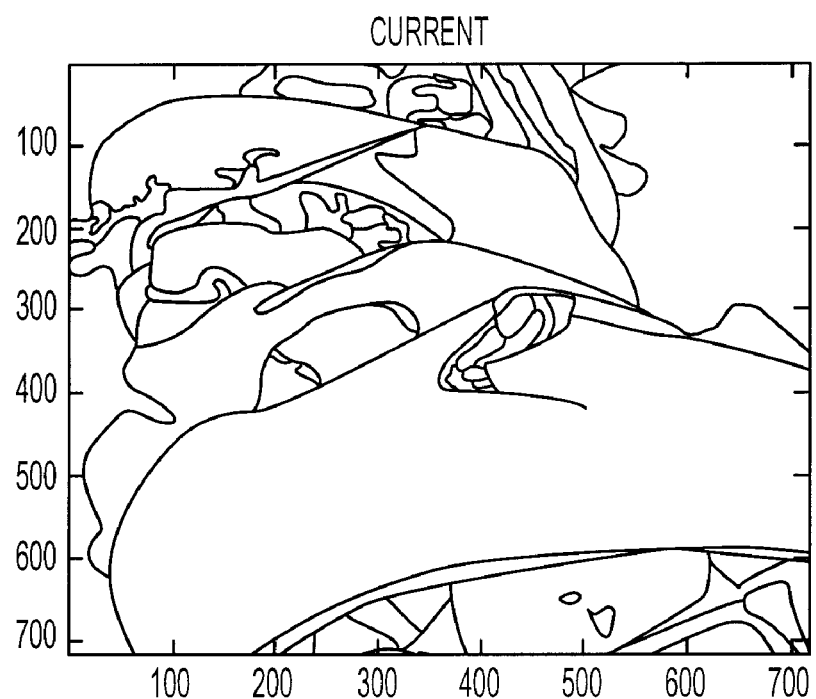
FIG. 5 is an image of a currently rendered 2D image.
Figure 6:
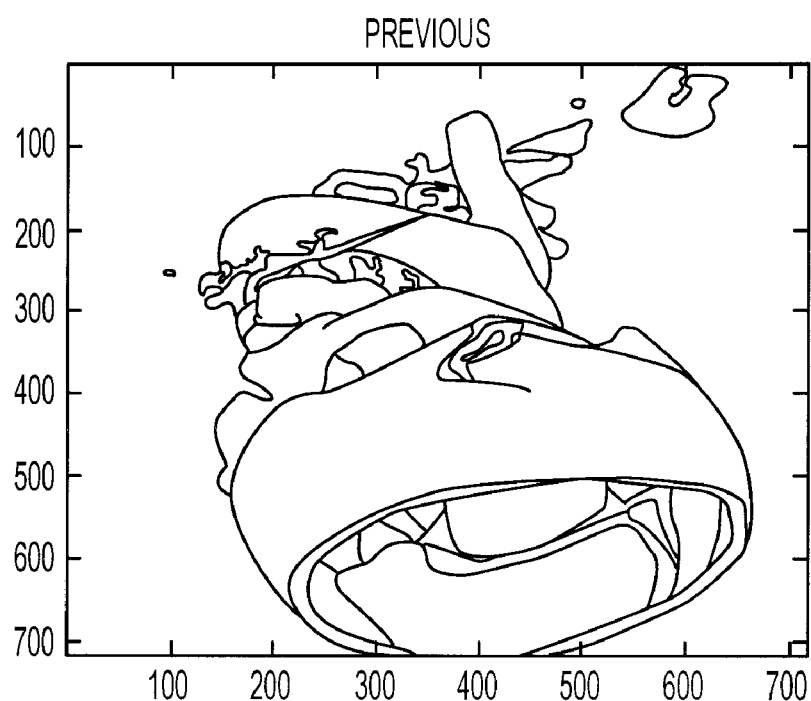
FIG. 6 is an image of a predicted image.
Figure 7:
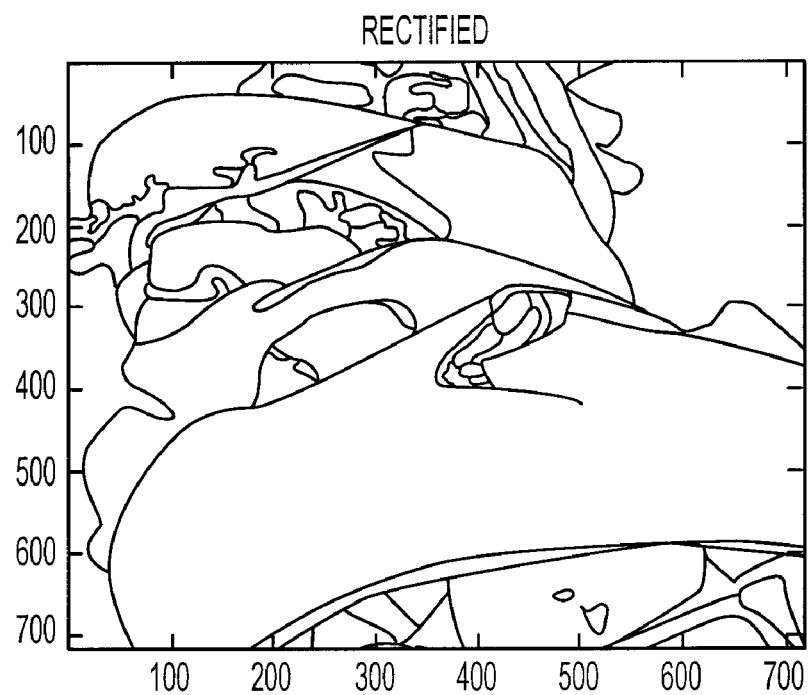
FIG. 7 is an image of an error image.
Figure 8:
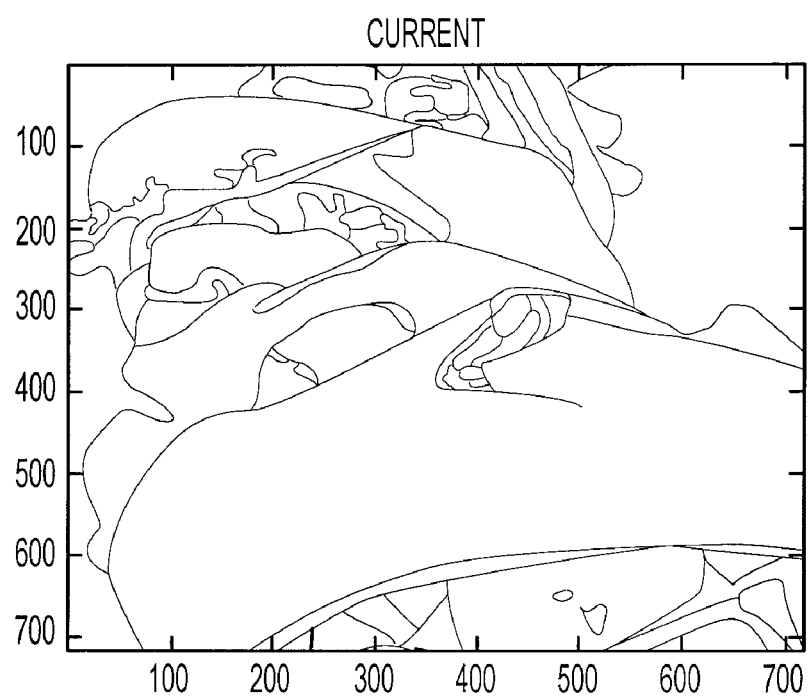
FIG. 8 is an exemplary flowchart of a context-sensitive compression using a previously predicted image.

FIG. 4 is a flowchart illustrating the transmission of compressed image information that allows providing the current image B without loss to the user. The context-sensitive compression system 400 includes a prediction unit 410 for predicting a predicted image B' based on an input image and an analysis unit 420 that analyzes the prediction.

Specifically, the renderer 120 renders the current image B using the rendering parameters T and θ provided from the user station 130. The rendering parameters T and θ represent information about the motion of the user's view point with respect to the 3D data; i.e., parameter T is a user input of a movement operation and parameter θ is a movement parameter that indicates the extent of the movement operation T. In the example of FIG. 4, T and θ are examples of context information that is available to the prediction unit 410. The rendering parameters T and θ are used by the prediction unit 410 as prediction parameters to predict the predicted image B' from a previously rendered image A, which is used as an input image or starting point of the prediction.

In the analysis unit 420, the predicted image B' is compared to the current image B to create an error image Δ(B, B'). The error image Δ(B, B') contains data indicative of the differences between the current image B and the predicted image B'. It can be evaluated using a threshold-analysis of representative statistical values, such as a mean squared error value or a mean absolute difference value. The analysis allows determining whether the current image or the compressed image information, i.e., the error image Δ(B, B') and the rendering parameters T and θ, should be transmitted or whether an alternative prediction is necessary. For example, an alternative predicted image B' can be determined with a hierarchical multistage algorithm as described below. FIG. 5 to FIG. 8 show, for a zoom operation, examples of the current image B, the input image A, the predicted image B', and the error image Δ(B, B').

A lossless visualization of the current image B can of course be achieved when the current image B is transmitted. However, if the input image A is accessible, for example, from a local memory 430, the decompression of compressed image information in the decompressor 230 can also result in a lossless reproduction of the image B. In such cases, the input image A and rendering parameters T and θ are used to 're' predict the predicted image B' in the reprediction unit 440. In the reconstruction unit 450, the predicted image B' is combined with the transmitted error image Δ(B, B') to reconstruct the current image B, which is then provided to the user station 130.

There can be several variations of the prediction. Instead of using the previously rendered image as an input image A, the prediction can use any preceding image, any decompressed image, or any previously predicted image A. The prediction parameter provided to the prediction unit 410 can include the exact and complete movement parameter defined by the user or estimated parameters (θ', T') of the movement parameter θ and/or movement operation T. In any case, a lossless image B can be provided to the user 130 as long as the information about the prediction and the error image Δ(B, B') are both transmitted with sufficient precision. However, some uncertainty in, for example, the error image Δ(B, B') can be caused by calculation errors that arise when comparing the predicted image B' with the current image B. Such uncertainty can compromise the quality of the reconstructed image B.

Lossy Compression

A larger compression may be needed to maintain quality-of-service while a user interacts with the visualized image, for example, while choosing the right viewing angle. In such cases, a user may tolerate a lossy image with a reduced fidelity in exchange for lower latency. A larger compression may also be necessary when non-rendering context information is present. For example, the compressor 210 can adaptively compress an image in response to detecting a low transmission rate of the network.

The amount of data that has to be transmitted can also be reduced by reducing the fidelity of the current image B using intra-frame coding (for example, down sampling, subband techniques or pyramid methods). Similarly, reducing the quality of the error image Δ by quantization will reduce the amount of data that has to be transmitted.

Context Information

Examples for context information include a user induced visualization parameter, a visualization-implicit parameter, a user induced system parameter, and a system-implicit parameter. User induced visualization parameters are parameters that specify the visualization that is requested by a user, e.g., the rendering parameters such as the movement operations T and parameters θ. Examples for operations T include, within the clinical workflow, the selection of parameters for windowing/leveling, rotating, panning, and zooming. Visualization-implicit parameters are parameters that are used within the visualization system, e.g. for rendering algorithms, parameters that are used within the algorithm and are, for example, preset such as the type of projection.

Algorithm related context information may also include characteristics of the algorithm. For example, if a deformed volume were rendered and if that rendering were the outcome of fusing two images together (PET+CT for example), the compression algorithm could advantageously use this fact by predicting that the output image should be the same size and orientation (i.e. no motion vectors) but just have a different shape. Furthermore, the prediction would likely improve if it knew whether the deformation was a simple rigid deformation or a non-rigid deformation.

User induced system parameter are parameters that are assigned by the user to the visualization system and do not control the renderer (non-rendering context information). For example, when the system is assigned to be used in the interactive mode, e.g. for finding the best view and presentation of a field of view, a lossy visualization is acceptable. However, when the system is assigned to be used in the definitive mode, e.g. for precisely diagnosing the image, a lossless visualization is expected. Another example of a user induced system parameter is the type of renderer that is requested.

System-implicit parameters are parameters that are defined by the system components itself, e.g. the system structure, the network condition (e.g. the load on the network and the type of network: wireless, 10 Mb, 100 Mb) and the computational availability (e.g., the presence of a central processing unit, a graphical processing unit, or a general purpose graphical processing unit. In a multi-user system, for example, the compression algorithm could proactively adapt its parameters depending on whether it was operating during periods of peak network load or during periods of sparse network load.

Figure 9:
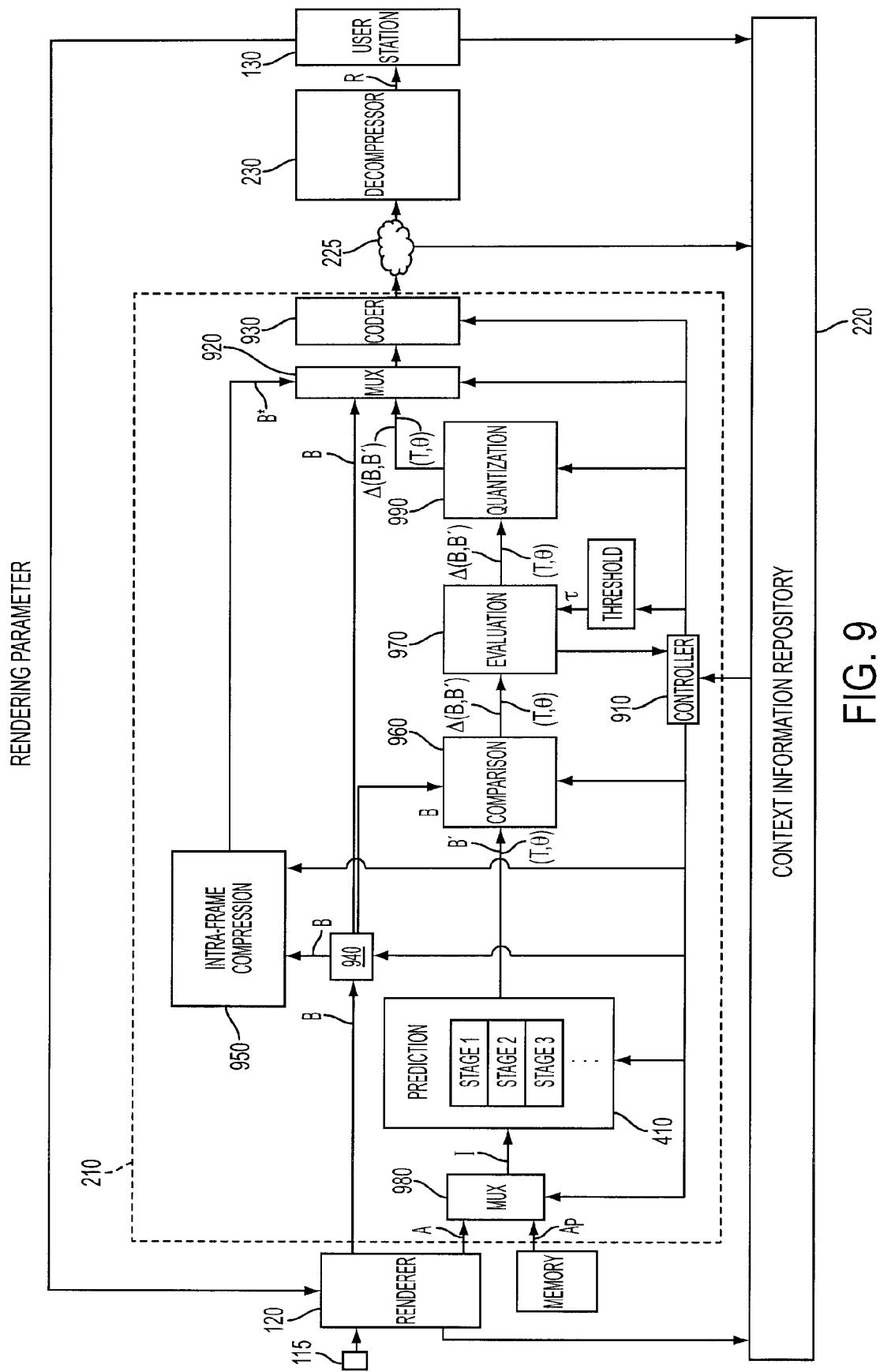
FIG. 9 is a detailed flowchart of a context-sensitive compression.

Context information in form of such parameters can be exploited by the context-sensitive compression system to determine the representative information for the current image. The context information is stored in the context information repository 220 and can interact with different parts of the system when it is evaluated by the controller 910. For example, it can affect the flow of the compression algorithm, e.g., input parameters for the prediction and analysis units or choices that have to be made FIG. 9 shows an exemplary implementation of a context-sensitive compression system that responds to context information. Context information is used to control the transmission of an image according to the quality required by a user and to reduce the amount of data that has to be transmitted to the user station 130 while allowing a visualization of an image with a requested quality.

In operation, a user requests an image B, which is a rendered image derived from 3D data provided by the data bank 115. On the basis of available context information, a compression controller 910 connected to a control input of a multiplexer 920 selects which of several types of data representative of image B is transmitted, i.e., what kind of representative image information the multiplexer 920 provides to a coder 930. Examples of image information that the multiplexer 920 can provide include the current image B, an intra-frame compressed version B* of current image B, or context-sensitive compressed image information (Δ(B, B'), T, θ). The coder 930 prepares whichever image information the controller selects for its transmission through the network 225. The optional decompressor 230 produces the reconstructed image R from the transmitted data. An image derived from this data is then visualized on the user station 130.

By controlling a switch 940, the controller 910 can provide image B directly to the multiplexer 920 or to an intra-frame compression unit 950, which uses conventional intra-frame compression techniques to create an intra-frame compressed image B*. Additionally, the controller 910 can cause the switch 940 to provide the image B to a comparison unit 960. The comparison unit 960 receives a predicted image and context information from the prediction unit 410, compares it with the rendered image B, and provides the resulting comparison to an evaluation unit 970.

The context-sensitive compression method predicts an image B' that is as similar as possible to the image B. The comparison unit 960 and the evaluation unit 970 cooperate to analyze the predicted image B'. If the predicted image B' is similar enough to image B, the compressor 210 transmits the residual information, i.e., the error image Δ(B, B'), together with information about how the prediction was achieved.

The illustrated method uses an input image I for prediction. Using a multiplexer 980, the control unit 910 can select an input images from among several sources, two of which namely a previously rendered image A or an images $A_p$ stored in a buffer unit 985, are shown. The input image I and context-information from the controller 910 enable the prediction unit 410 to create the predicted image B'. The comparison unit 960 compares the predicted image B' with the current image B to produce the error image Δ(B, B'). The evaluation unit 970 then uses the error image Δ(B, B') to gain information about the quality of the prediction. Measures for the comparison and the evaluation can be controlled by considering available context information. For example, the error image Δ(B, B') can be compared with a threshold τ that depends on the network load. Depending on the result of the evaluation, one of the error image Δ(B, B') and the prediction parameters, the current image B or an intra-frame compressed image B* is transmitted to the user or the prediction image is further improved through the application of another stage in the prediction unit 410.

The error image Δ(B, B') is provided to a quantization unit 990. The compressor controller 910 either causes the quantization unit 990 to do nothing, in which case the error image Δ(B, B') is transmitted at high fidelity, or it causes the quantization unit 990 to quantize the error image Δ(B, B') to further reduce the amount of data, when, for example, the visualization of a low resolution image is sufficient.

Thus, rendering context information can affect the prediction in various ways. Non-rendering or system context information can affect the analysis, e.g. the determination of the error image Δ(B, B') and of the threshold τ for the evaluation. Non-rendering context information can also affect the prediction and whether at all a context-sensitive compression is required or whether quantization or intra-frame operations are sufficient.

Multistage Prediction

In contrast to a generic video codec, which processes with arbitrary motions, the compression system 210 considers mainly a subset of those potential motions that would be available in interactive visualization of 3D objects. Generally speaking, these potential motions are predefined by the user interface of the interactive visualization applications. These motions include one or more of the following operations: changing pitch, roll, or yaw of the object, zooming in or out, shearing, windowing, shifting and panning the object. The motions are manipulated by a user through the graphical interface with a mouse, joystick, or trackball. Using a keyboard, users assign special values (referred to generally as rendering parameters θ) to the motion operations. The operations (referred to generally as "T") and the rendering parameters θ represent rendering context information.

There are at least three scenarios in which rendering context information is available for the prediction of the predicted image:

Scenario a) Complete knowledge of relative motion information between the input image and the current image, i.e., T and θ are known.

Scenario b) Partial knowledge of relative motion information between the input image and the current image, i.e., only T is known and θ has to be estimated.

Scenario c) No knowledge of the specific operation and its parameter: T and θ have to be estimated, but the range of θ and the available operations are known.

To reduce the computations, the images are handled and the temporal intra-frame information is exploited in a hierarchical manner. The different scenarios are evaluated to progressively estimate the prediction image B' using a hierarchical multistage algorithm with progressive complexity.

In a first stage of the prediction unit 410, small changes from the input image to the current image are assumed, and the operator T is known. Three possible "direct predictions" are presented. First, the motion operation T is assumed to be the identical operator and the predicted image equals the input image (B'=A). Assuming that the evaluation of the error image indicates a sufficient compression, the compressed image information constitutes of the identity operator and the error image. Second, in case of scenario a) the motion information and the input image I are known. Using T and θ, the current image B is calculated: $B=I_{(T,\theta)}$. Due to running errors or small differences caused by the application of 3D rendering parameters to the 2D image, the calculated image might deviate slightly form the current image: $B \sim I_{(T,\theta)}$. The difference of the images B and $I_{(T,\theta)}$ can be calculated as a residual error image. To the extent such an error image exists, it joins the motion information as part of the compressed image information. Third, only a change of the pixel values is required due to a change in windowing and leveling. Such a scaling can be predicted, for example, with a Least-Square-Approximation (B'=aI+b). In that case, the error image and the approximation parameters a and b constitute the compressed image information.

If, based on context information, further compression is sought, the error image can be quantized, while the approximation parameters a and b are transmitted with high precision.

In a second stage of the prediction unit 410, a motion operator T is known, but its parameter θ needs to be estimated for the calculation of the predicted image B' (scenario b). Exemplary approaches to estimate the motion parameter θ, are a Least-Square-Method, a rigid motion model (Affine model) or a phase correlation model.

In a third stage of the prediction unit 410, a motion operator T and its parameter θ need to be estimated for the calculation of the predicted image B' (scenario c). Exemplary approaches are the rigid motion model (affine model) and the phase correlation model, as in stage 2.

In a fourth stage of the prediction unit 410, the image is partitioned into smaller blocks, for which one or more of the previous stages are applied individually.

Specific example for different prediction methods of the different stages will be discussed below.

Stage 1: Least-Square-Approximation

When the derivatives as well as the motion parameters are small, the image similarity and error image are calculated at the whole-picture level without going further to explicitly estimate motion parameters. That is, I(x+u, y+v, t) is approximated by I(x, y, t−1) using a linear prediction method, for example, least square approximation. The variables x and y represent the pixel position and u and v represent the motion parameters. The variable t indicates the series of images in time. This approximation is useful when the (virtual) camera positions (view points) are close, in which case the similarities between the images would be significant. By directly calculating the error image for the whole image without decomposing the images into smaller macroblocks and matching them in a pair-wise fashion, the related computations for a large part of images that have to be transmitted is minimized. The whole-frame motion description tends to work well when the sampling frequency is high or when the camera motion is small. In such cases, instead of sending the whole frame, one transmits only the error image.

However, when dramatic (virtual) camera motions are present, the differences between images may become big. In this case, one optional way is to code the newly rendered image separately from the previous ones. When this option is used, the computations at the server and client sides are small.

The compressor 210 decides whether the similarity is sufficient, and uses a flag to inform, for example, the client. The client decompresses the transmitted bit stream and reads the flag information. If the image B has been coded independently, the decoded image is the image B which is displayed; otherwise, the decoded image is the error image, which is used to reconstruct the image B. This simple option is particularly useful when the client is thin.

Stage 1: Complete Motion Information

When a priori motion information is available to the compression system 210, e.g., derived from end-user mouse movements and sent as ancillary data outside the rendering context to the context information repository 220, the a priori motion information can be utilized directly. The view-transformation process determines the new position on the image plane and the movement of the object is represented by a transformation matrix, as described for example by J. Foley et al., "Computer Graphics: Principles and Practice," Addison-Wesley, 1997, the contents of which are herein incorporated by reference.

The parameters for the translations along x-, y-, and z-axis, the zooming factor, and the rotations are directly derived from this transformation matrix. After projecting onto the image plane using a projection matrix of the renderer, the corresponding positions on the image plane are found. The motion information is thus available and utilized by the compression system 210. Even if the a priori information is not that specific, e.g., in the form of known parameters from the transformation matrix, knowing the types of operations is already useful for compression, as one can design specific predictions and motion compensation methods tailored to each individual operation.

Stage 2 and 3: Partial or No Motion Information

In many cases, a priori motion information is not available to the compression system, e.g., when the rendering and compression systems are independent of each other. This can arrive, for example, when the systems are from different vendors. In such cases, the compression system 210 receives only the sequence of images as its input, and directly derives the predicted image B' from rendered images, e.g., from images A and B. Given the fact that changes of the viewpoint and user interactions mainly consist of several predefined types, such as panning, zooming, rotating, shearing, and windowing, the newly rendered image has a close relationship with the previous one. Accordingly, the motion of the object on the image plane can be modeled by using affine projection, or orthographic projection models.

Affine Model to Determine Motion Parameters

The adoption of an affine model for the compression system is described below, but other models can also be used in a similar way. In discussing the affine model, the following equations are useful:

$$x+u=a\,x+b\,y+e,$$
$$y+v=c\,x+d\,y+f. \quad (1)$$

In equation (1), (u, v) represent the vector field and (x, y) are the pixel positions. The motions of the object in the image plane include scaling, translation, rotation, shearing, etc. This affine model is thus a simple yet effective way for an interactive remote visualization application to capture the effects of commonly used operations. The simplicity of using six parameters (a, b . . . f) to represent the motions in the image plane reduces the complexity greatly.

As an example, suppose the rendered images are described with a first-order Markov model, with a rendered image at time t defined by I(x, y, t), where x and y are pixel positions, and t represents a temporal index, such as a frame number. Then the motion information to predict I(x, y, t) is available from I(x, y, t−1) without considering any images with temporal indices prior to t−1. This first-order Markov model thus reduces the computational complexity and the required memory storage.

To estimate the motion parameters, one can apply a different method, for example, a least square estimation. Notice that, the affine model can be further simplified when the knowledge of the applied operation T sets one or more of the six affine parameters to zero. Thus the computation can be further reduced.

Assuming that the motion is small, a Taylor series approximations of a succeeding frame based on an earlier frame yields:

$$I(x+u,y+v,t)=I(x,y,t-1)+I1(x,y,t-1)u+I2(x,y,t-1)v+I3(x,y,t-1)+o(u,v) \quad (2)$$

In the above equation, (u, v) represent the displacements at point (x, y), I1, I2, and I3 are partial derivatives with respect to x, y, and t, respectively; and o(u, v) represent the higher-order terms. This representation links the motion and the consecutive images, with the calculations of spatial and temporal derivatives. When the affine model is applied, the affine parameters are estimated.

Estimation of Affine Parameters

Using n pixels for the estimation, equation (1) can be rewritten as $$T=GX+N,$$

with $X^T$=(a, b, c, d, e, f) denoting the affine parameter vector, G being a matrix with size n×6 and being defined as $G^T$=[H $(x_1, y_1)$|H$(x_2, y_2)$| . . . |H$(x_n, y_n)$], where H(x, y) is defined as H(x, y)$^T$=(xI1, yI1, xI2, yI2, I1, I2), and an error vector N and a temporal derivative vector T being defined by $$N^T = [I(x_1+u_1, y_1+v_1, t) - I(x_1, y_1, t-1) + o(u_1, v_1), \quad (3)$$
$$\ldots, I(x_n+u_n, y_n+v_n, t) - I(x_n, y_n, t-1) + o(u_n, v_n)],$$
$$T^T = [-I3(x_1, y_1), \ldots, -I3(x_n, y_n)]$$

G is usually an over-determined matrix. The error terms mainly consist of higher-order approximation errors and the differences in intensities after the motion. If the motion is small, the error vector is small. Assuming that N is a white Gaussian noise vector, a linear system is corrupted by white Gaussian noise. The coefficients X can be found by simple data fitting methods. For, example, a least-square method is employed to find the coefficients:

$$\hat{X}=(G^TG)^{-1}G^TT \quad (4)$$

Random Selection of n Pixels

Since matrix inversion and multiplication are involved, the computations are reduced by choosing a small subset of data points, which in this case correspond to pixels. To avoid increasing the inaccuracies, one chooses salient data points to calculate X. For this purpose, one first chooses, a region from which to choose the data points. For convenience, a central part with the size reduced by a factor of two is used. The salient points can be chosen with a joint random selection method. If the candidate salient point has spatial derivatives that are larger than a predetermined threshold, this candidate point is retained; otherwise, it is rejected and the next candidate point is selected. If after a certain number of iterations no data point can be retained, a different region is used to select candidate data points. A corresponding algorithm may show the following basic aspects:

Step 1. Fix a region Ω1;
Step 2. Choose a point (x, y) in Ω1, calculate I1(x, y), I2 (x, y);
Step 3. If I1(x, y)>Threshold1 and I2(x, y)>Threshold2, retain it; Else, reject it;
Step 4. If the number of retained points is less than the predetermined number, return to Step 2; else stop.
Step 5. If the number of iterations reaches an iteration threshold and no points have been retained in region Ω1, then denote a different region as Ω1, and return to Step 1.

Such a derivative based evaluation chooses edge data points that may give information on edges within the image. In some practices, a candidate data point is accepted if it lies between two threshold values.

Number of Data Points

The number of data points can be determined in advance. For example, the use of 12 data points show results that are satisfactory. More data points make the algorithm more stable, however, computationally less efficient. The random method is designed for efficiently searching for the motion fields between images with stable performance.

For a general affine model, there are 6 unknown parameters. For the pseudo-inverse matrix to be well-conditioned, the linear system of equation (4) must have at least 6 independent equations. For specifically known operations (stage 2) such as panning, zooming, etc., the number of unknown parameters is smaller, and in fact can be as small as one. In such cases, the linear system of equation (4) is reduced to a smaller size, and the estimation is less computationally complex. When for cases such as panning the context information is retrievable, the formulas can be explicitly written out. The calculations are significantly smaller and the results are particularly accurate.

When the white Gaussian noise model is ill-suited for the data, the performance may be degraded. In such cases, it is useful to use other data-fitting methods. For example, when the wings of the error distribution are heavy-tailed, a heavy-tailed model can be adapted for use as a data-fitting method. One such model is a least median method, which requires the ordering of the derivatives, but may be more robust.

Multi-Scale Method

When the motion vectors are small for interactive remote visualization applications, the above described approach works well. This is reasonable when the camera's motion curve is continuous in practice and the sampling frequencies are high, which occurs frequently for smooth visual experience.

However, there are cases that the small motion assumption may be invalid, e.g., when the users make dramatic changes by jerking the mouse. In such cases, a multi-scale method is used. Multi-scale methods rely on the fact that a big motion spanning many pixels becomes a smaller motion at lower resolutions, and the small motion assumption becomes valid.

The multi-scale method may be iterated for a number of times. At the lowest resolution, the motion is first searched. By going up to finer resolutions, the motion parameters are gradually built. For this purpose, multiple level hierarchical methods are particular useful. In one example, the image is iteratively down-sampled by a factor of 2 to obtain lower resolutions. The levels can be between 0 and 4. The down-sampling is used for simplicity. Other multi-resolution approaches can be used in a similar way.

Transform Domain Method to Determine Motion Parameters

As an alternative to the affine model in stages 2 and 3, transform domain methods can be applied. For example, a phase correlation method can be used to calculate the motion parameters. The first step is to use the phase correlation to calculate the shift parameter. A shift or translation in the spatial domain corresponds to a phase shift in the frequency domain. By using a fast Fourier transform, the phase shift can be calculated. After this step, if the error image is below a certain level, the prediction is stopped. Otherwise, is the prediction proceeds to identify and quantify any zooming or rotating. In transform domain methods, it is useful to apply a coordinate transformation to a polar coordinate system, and then evaluate the logarithm. In the polar coordinate system, zooming or rotation becomes a shift and phase correlation can be utilized. The correlation can be based on a randomly selected set of data points.

Stage 4: Partition

If the predicted image is significantly different from the current image, the current image can be encoded independently, or a fourth stage can be applied to search for more accurate motion parameters. In one example of a fourth stage, the image is partitioned into smaller blocks, with a local motion estimation being carried out on each block. The partitioning of the image is effective when the motion of the object is not well described by an affine model, for example, due to large occlusion areas. However, the effectiveness of partitioning the image and block-based processing to find the local motions for each block comes at the price of more computations. The user decides whether to carry out this further processing, for example, by indicating this choice at the graphical user interface. This may occur if a user wants to have greater fidelity, or if the client system has adequate computational power. Otherwise, the user can forego the additional detail and have the image be compressed independently.

The prediction unit 410 calculates the predicted image with the motion parameters resulting from the affine parameters or the phase correlation parameters. Once it does so the comparison unit 960 compares the predicted image to the current image. On the basis of that prediction, the evaluation unit 970 calculates an error image.

Encoding

The controller 910 chooses either the current image or the error image for transmission in part on the basis of context information. For example, lossless coding is used for the definitive mode and lossy for interactive. The server chooses the rates, distortion, and compression settings for encoding by monitoring the network traffic and bandwidth conditions and the computational capabilities of the clients. Besides the hierarchies of multiple stages of the system and the feedback rate control mechanism described below, a multiple description scheme is useful to further adapt to the bandwidth conditions and client resources, see for example Y. Wang et al., "Multiple description coding for video delivery," Proc. IEEE, vol. 93, no. 1, pp. 57-70, January 1995. Multiple description includes generation a number of bit-stream layers, each of which contains similar information about the source and is used to construct a lower resolution image. More layers give better qualities. The one embodiment uses an 8×8 discrete Fourier block transform for fast calculations. Other transforms, including the wavelet transform, can be included in a similar way.

Encoding and Non-Rendering Context Information

If the prediction image is similar to the current image, the encoder 930 encodes only the new information in the current image that is not available from the rectified image. The encoding method is chosen according to the context information, for example, according to the selected level of compression. This includes the user's selection, the bit rate input from the server that monitors the network traffic and bandwidth usage, and/or the switch between interactive and definitive modes. The user's selection has a high priority. At the default setting, the compression system automatically selects the bit rate according to the network conditions. In some embodiments, the resources of the client machine are provided as a feedback to the server, so that the server can carry out rate control. The feedback mechanism relies on the corresponding changes of the communication protocol between the remote clients and the server. For example, when the rendering requests are sent to the server, the status of the available resources is sent simultaneously. The statuses may be defined in advance and in simple form. For example, only the types of operations of the user are specified. To reduce communication overhead, the number of statuses is kept as small as possible consistent with the computation capabilities of the clients and user interface.

Context-Sensitive Rate Control

In at least one embodiment, a feedback or feed-forward mechanism controls transmission rate based on context information. The rate control is performed, for example, by changing the compression quantization step sizes or by low-pass filtering the error images. The quantization step sizes or low pass filter may be chosen in a deterministic way. In some embodiments, according to the network conditions, a fixed step size or bandwidth of the low pass filter achieves an approximate bit-rate. This is suitable when the 8×8 discrete Fourier block transformation is employed, for which the quantization step sizes have known correspondence to the bit rates, i.e., the data can be fitted into the bandwidth of the network. A disadvantage of this deterministic method is its reliance on bandwidth information, which requires the monitoring of the network traffic or the usage bandwidth.

Another adaptive method avoids the needs of closely monitoring the network by exploiting feedback from the client. In one embodiment, when the resulting bit rate from the compression is inadequate, the client sends the request with a flag bit asking for a higher bit rate. Otherwise, the client sends the request with a different flag bit asking for a lower bit rate. Upon receiving these flag bits, the compression system adapts the quantization steps, accordingly. As a consequence, the image to be transmitted is quantized more coarsely, and the compression ratio becomes larger. A corresponding algorithm shows the following basic aspects:

```
If interruptive mode, yes; stop anywhere in the loop;
If Deterministic_Mode, no Quantization; Compress Losslessly;
Else if Interactive_Mode,
    If COMP_COARSE, Quantization Stepsize + = Delta stepsize;
        Increase Threshold for comparingdifference image;
    else if COMP_FINE, Quantization Stepsize − = Delta stepsize;
        Increase Threshold for comparingdifference image;
    else Quantization Stepsize is the same, Threshold is the same;
```

The flag bit is used jointly with the mode declaration bit. When the visualization is in the interactive mode, the rate is preferably adjusted instantaneously; when in definitive mode, the coarsely compressed image is sent first, followed by the differences between the coarsely compressed image and the original image. These differences undergo lossless compression. Because the differences contain much smaller amounts of information, and because at definitive mode, the user usually can afford to wait, the additional latency arising from lossless compression might not be critical. The lossless codec might not be very sophisticated but the computation is preferably simple enough to accommodate thin clients into consideration. In the interruptive mode, the compression can be stopped and restarted at any time without requiring, for example, the transmission of a packet of images.

Figure 10:
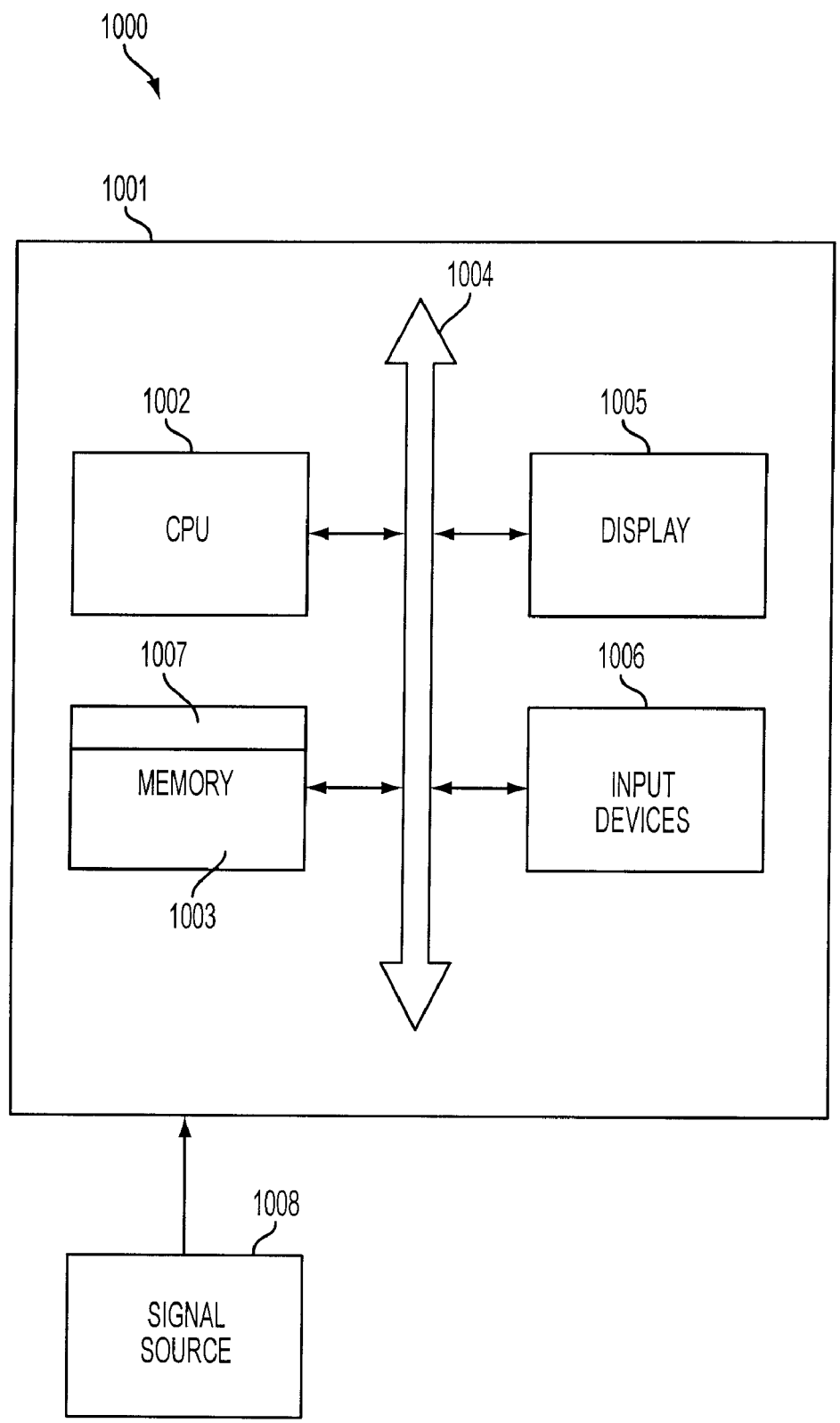
FIG. 10 is a diagram illustrating an exemplary data processing system in accordance with an embodiment of the present invention.

Referring now to FIG. 10, according to an embodiment of the present invention, a computer system 1001 for implementing the present invention can comprise, inter alia, a central processing unit (CPU) 1002, a memory 1003 and an input/output (I/O) interface 1004. The computer system 1001 is generally coupled through the I/O interface 1004 to a display 1005 and various input devices 1006 such as a mouse and a keyboard. The support circuits can include circuits such as cache, power supplies, clock circuits, and a communication bus. The memory 1003 can include random access memory (RAM), read only memory (ROM), disk drive, tape drive, etc., or a combinations thereof. The present invention can be implemented as a routine 1007 that is stored in memory 1003 and executed by the CPU 1002 to process the signal from the signal source 1008. As such, the computer system 1001 is a general purpose computer system that becomes a specific purpose computer system when executing the routine 1007 of the present invention.

The computer system 1001 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

For example, the numerical and symbolic steps described herein can be converted into a digital program executed, e.g., on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits within the compressor that executes the steps. Methods for generating such dedicated electronic circuits based on a given numerical or symbolic analysis procedure are also well known in the art.

A number of embodiments of the invention have been described. Nevertheless, it will be understood that various modifications may be made without departing from the spirit and scope of the invention. Accordingly, other embodiments are within the scope of the following claims.

What is claimed is:

1. A method for providing information representative of an image in an interactive visualization system, the method comprising:
    selecting a current image from a stream of images;
    evaluating context information from a context information repository within the visualization system, wherein said evaluation further comprises:
    identifying prediction information given by the context information; determining a predicted image using the prediction information and an input image; and
    determining representative information for the current image on the basis of the context information, wherein the context information provides for dynamically self adapting a transmission rate based upon one of computational capabilities and network conditions wherein adapting the transmission rate further comprises one of adjusting compression quantization step sizes and low pass filtering error images.

2. The method of claim 1, further comprising:
    retrieving data representative of the current image from a 3D-data set; and
    rendering the current image on the basis of the retrieved data.

3. The method of claim 1, further comprising:
    coding the representative image information for transmission; and
    transmitting the coded representative image information to a visualization unit of the visualization system.

4. The method of claim 3, further comprising:
    reconstructing the coded representative image information to a reconstructed image; and
    displaying the reconstructed image.

5. The method of claim 1, wherein the context information is selected from the group consisting of a user induced visualization parameter, a visualization-implicit parameter, a user induced system parameter, and a system-implicit parameter.

6. The method of claim 1, further comprising determining the representative image information to be one of the group consisting of the current image, intra-frame reduced image information of the current image, and context-sensitive compressed image information of the current image.

7. The method of claim 1, further comprising determining the representative image information to have a fidelity which specifies a reconstruction of a lossy reconstructed image.

8. The method of claim 6, wherein the representative image information includes intra-frame reduced image information, the method further comprising generating the intra-frame reduced image information of the current image using one of a down sampling method, a subband image processing method and a pyramid method.

9. The method of claim 1, further comprising:
determining an error-image on the basis of the predicted image and the current image; and
statistically evaluating the error image to determine whether a context-sensitive compressed image information comprises the prediction information and the error image.

10. The method of claim 9, further comprising selecting the input image from a group consisting of the current image, a previously predicted image, and a previously reconstructed image.

11. The method of claim 9, further comprising determining the predicted image using a prediction stage selected of a group consisting of a linear prediction stage, a predicted stage using a predicted parameter and a known operation, and a prediction stage using a predicted operation and a predicted parameter of the predicted operation.

12. The method of claim 9, further comprising applying the prediction information to a section of the input image and determining context-sensitive compressed image information of the section as part of the representative image information.

13. The method of claim 9, further comprising:
reproducing the predicted image using the prediction information and the input image;
combining the predicted image with the error image to reconstruct a reconstructed image; and
displaying the reconstructed image.

14. The method of claim 3, further comprising adapting the coding of the representative information of the current image on the basis of available context information.

15. The method of claim 3, further comprising coding the representative information of the current image using a multiple description scheme.

16. A non-transitory computer readable medium having included software thereon, the software including instructions to provide representative image information in an interactive visualization system, the instructions comprising:
selecting a current image of a stream of images;
evaluating context information within the visualization system, wherein said evaluation further comprises:
identifying prediction information given by the context information; determining a predicted image using the prediction information and an input image; and
determining representative information for the current image under consideration of the evaluation of the context information, wherein the context information provides for dynamically self adapting a transmission rate based: upon one of computational capabilities and network conditions wherein adapting the transmission rate further comprises one of adjusting compression quantization step sizes and low pass filtering error images.

17. The computer readable medium of claim 16, the instructions further comprising:
coding the representative image information for transmission;
transmitting the coded representative image information to a visualization unit of the visualization system;
reconstructing the coded representative image information to a reconstructed image; and
displaying the reconstructed image.

18. The computer readable medium of claim 16, the instructions further comprising:
determining an error-image on the basis of the predicted image and the current images; and
statistically evaluating the error image to determine whether the prediction information and the error image constitute the context-sensitive compressed image information.

19. The computer readable medium of claim 18, the instructions further comprising:
reproducing the predicted image using the prediction information and the input image;
combining the predicted image with the error image to reconstruct a reconstructed image; and
displaying the reconstructed image.

20. A visualization system for providing information representative of an image, the system comprising:
a central processing unit that renders images from 3D data; and
a context-sensitive compressing system providing image information representative for a rendered image on the basis of context-sensitive information and said context-sensitive compressing system determines representative information for a current image under consideration of an evaluation of the context-sensitive information, wherein the context-sensitive information provides for dynamically self adapting a transmission rate based upon one of computational capabilities and network conditions wherein adapting the transmission rate further comprises one of adjusting compression quantization step sizes and tow pass filtering error images.

21. The system of claim 20, further comprising a controlling unit within the context-sensitive compressing system for controlling the provided representative image information to be from the group consisting of the current image, intra-frame reduced image information of the current image, and context-sensitive compressed image information of the current image.

22. The system of claim 20, further comprising a decompressing system and a visualization unit, the decompressing system is connected to the compressing system through a network to receive the representative image information for reconstructing a reconstructed image, and the decompressing system being connected to the visualization unit for displays the reconstructed image.

23. The system of claim 20, further comprising a coding unit to code the representative image information for transmitting the coded representative image information to the decompressing system.

* * * * *